Patented Aug. 23, 1949

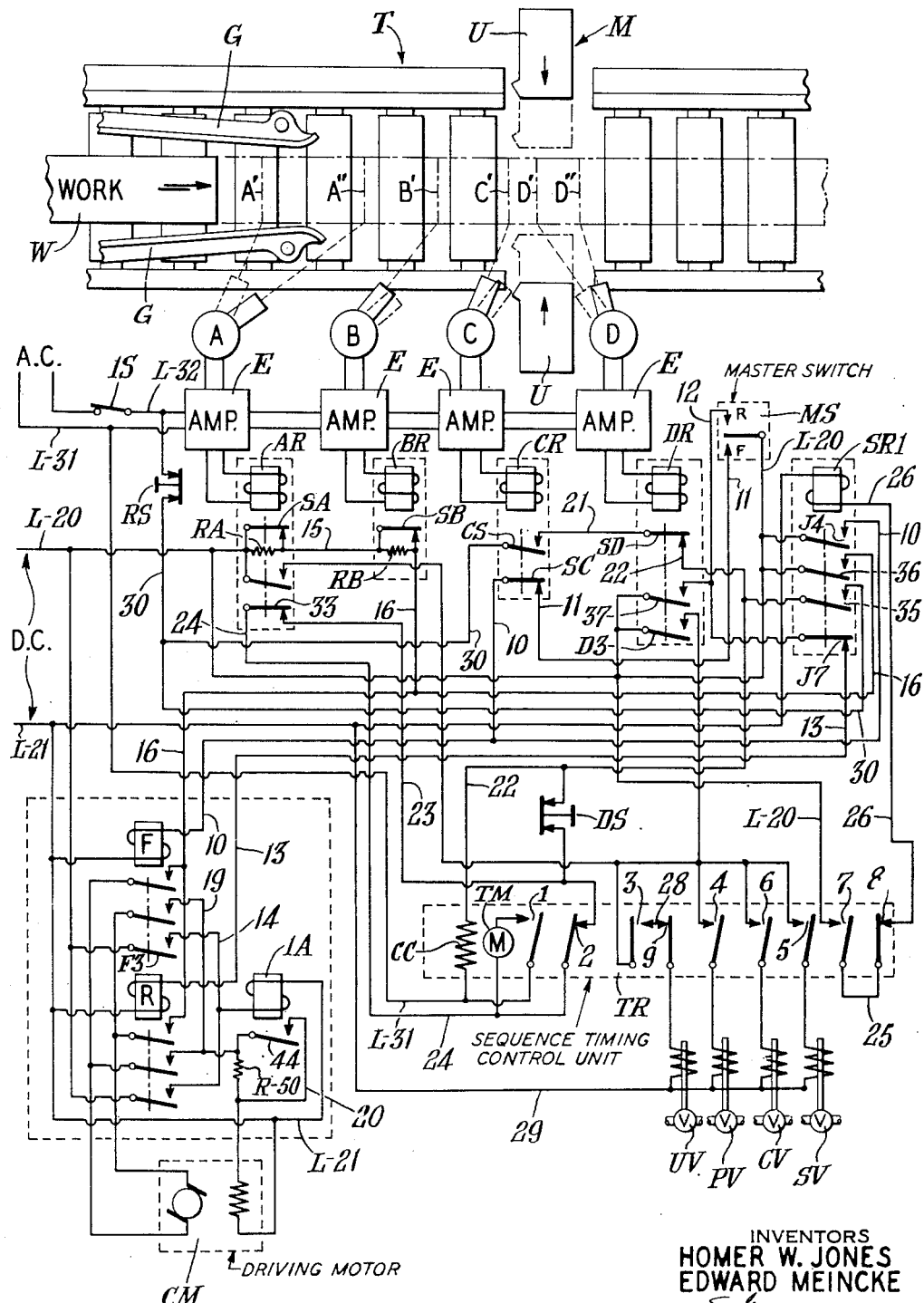

2,479,624

UNITED STATES PATENT OFFICE 2,479,624

FULLY AUTOMATIC DESURFACING CONTROL SYSTEM

Homer W. Jones, Westfield, and Edward Meincke, Summit, N. J., assignors to The Linde Air Products Company, a corporation of Ohio Application October 6, 1945, Serial No. 620,700

4 Claims. (Cl. 266—23)

This invention relates to fully automatic control systems for handling and thermally treating metal bodies, and more particularly for automatically controlling the movements of relatively hot metal bodies, in succession, in conjunction with thermochemical metal removal operations with respect thereto.

Heretofore, the operation of desurfacing machines for thermochemically conditioning surfaces of metal bodies has required the close attention of a skilled operator to stop the work in the correct position in the desurfacing machine for starting the desurfacing operation. Serious damage to the desurfacing machine results if the latter is improperly positioned when the work is moved to the desurfacing position. Furthermore, the nozzle blocks should be retracted and the gases turned off at a predetermined distance from the trailing end of the work or body being desurfaced for maximum safety and economy. These and other manually initiated functions obviously require judicious manipulation of the controls by the operator to obtain uniform surface conditioning of the metal bodies.

The main object of this invention is to provide an improved fully automatic desurfacing control system. More specifically the objects of this invention are to provide novel control means for automatically retarding the rate of approach of the work to the machine; stopping the work at precisely the correct position with respect to the desurfacing machine for preheating; turning on the preheating gas for a predetermined interval; turning on the desurfacing gases and slag water and starting the work in motion to desurface such work; and finally turning off the preheating gases, slag water, desurfacing gases, and stopping the motion of the work after the latter has been desurfaced.

According to the invention, radiant energy, such as heat radiated from the hot metal work, is picked up by a series of highly directional, strategically located, temperature sensitive elements, such as thermo-piles; and these elements, through suitable amplifiers, relays, control circuits, etc., perform all the functions necessary for fully automatic control of the desurfacing operation.

In brief, the hot metal body is advanced by a suitable conveyor such as a roll table in the direction approaching a scarfing machine, at normal speed until it enters the field of a first detector unit. This unit, through an amplifier, and relay system working into the roll table motor circuit, slows down the table speed. The body continues to advance until it enters the field of a second detector unit, which through a similar relay systems slows the roll table speed still further. A third detector unit stops the roll table and positions the work in correct relation to the blow-pipe units for processing. Simultaneously with this last-mentioned operation, a sequence timer is started and the scarfing functions occur at fixed intervals and order, and likewise, the roll table is started to move the work at scarfing speed in the forward direction.

A fourth detector unit is located in back of the scarfing machine to reverse the conveyor in the event the work overtravels the correct preheating position.

When the last timing interval has expired, the timer motor is stopped and continues in this state until the trailing end of the work passes out of the field of the first detector unit. This re-establishes the timing motor circuit and, after a fixed time interval, depending upon the roll table speed, the blowpipe units retract and a fixed time later all gases are turned off. The roll table continues to run until the trailing end of the work passes the last detector unit, or until the timer resets itself at some predetermined interval. This completes the cycle and the machine is ready for another body.

The above and other objects and the novel features of this invention will be apparent from the following description taken with the accompanying drawing which schematically illustrates a desurfacing machine and its roll table and includes a diagram of a control system exemplifying the invention.

As shown in the drawing, a work conveyor, such as a steel-mill roll table T, is arranged to move hot metal bodies W. such as bars, in succession, through the nozzle heads or blocks U of a desurfacing machine M located in the conveyor line. The machine M may be of the type disclosed in Bucknam Patent No. 2,244,822. Guides G are provided above the conveyor and in front of the desurfacing machine M to aline the work W with the center of such machine, the guides being pivoted for movement about vertical axes.

Four heat-sensitive detector units A, B, C and D are mounted alongside of the conveyor T, as shown. The units are adjustable about vertical axes to pick up radiation from the work W at desired points in the path thereof. Each detector unit is coupled to an amplifier E. The amplifiers E are connected to an alternating current supply circuit AC by a switch 18. Provision thus is made for disconnecting the detector units to permit testing of the scarfing machine M without interferring with normal roll table operation. The switch is open when the machine M is being tested. All of the detector units may be located in back of the machine M in case the scarfing is to be started at some distance from the leading end of the work, instead of being located in the positions shown in the drawing.

The cycle is started by movement of a master switch MS to "forward" position, which is assumed to be under the control of the operator performing the last operation on the work W prior to scarfing. The master switch MS controls the energization of forward and reverse relays F and R, respectively, from a direct current supply circuit DC. The relays F and R, in turn, control forward and reverse operation of the roll table driving motor CM. The master switch is left in the "forward" position and the work W is advanced at normal speed by the conveyor T until it reaches the field A' or A'' of the first detector unit A. Relay AR is then energized, thus opening a normally closed switch SA between wires L—20 and 15, thereby inserting a resistance element RA in the motor supply circuit, and causing the motor CM, the roll table T and the speed of the work W to slow down.

When the work W comes into view B' of the second detector unit B, relay BR is energized, opening a normally closed switch SB between wires 15 and 16, adding an additional resistance element RB in the motor supply circuit and thereby further reducing the motor speed, and consequently the rate of advance of the work W.

When the work W comes into view C' of the third detector unit C, relay CR is energized, thereby stopping the motor CM, the conveyor and the work completely, by opening a normally closed switch SC between wires 11 and 10, thereby deenergizing the roll table forward directional relay F. Simultaneously a normally open switch CS of relay CR, between wires 30 and 21, is closed, thereby starting a sequence timer TR from wire L32 through a normally closed restart pushbutton switch RS, wire 30, through the now-closed relay switch CS, wire 21, a normally-closed relay switch SD, wire 22, through the timer clutch coil CC, to wire L31. When the clutch coil is thus energized from the supply circuit AC, timer contacts 1 close, thereby energizing the timer motor TM from wire L31, through the now-closed contacts 1, the timer motor TM, wire 24, the closed timer contacts 2, wire 23, through a normally-closed time-delay push-button switch DS, wire 22, and hence to wire L32. A normally closed switch 33 of relay AR, between wires 24 and 23, will be open at this point and serve another purpose which will be explained later.

The timer TR causes the machine functions to occur in approximately the following order and at fixed intervals:

1. Timer contacts 3 close and cause the blowpipe units U to close around the bar W by energizing a solenoid operated valve UV.

2. Timer contacts 4 close and cause preheat gases to be supplied to the machine M by energizing a solenoid operated valve PV.

3. Timer contacts 6 close and cause cutting oxygen to be supplied to the machine M by energizing a solenoid operated valve CV.

4. Timer contacts 5 close and cause slag-treating water to be supplied to the machine M by energizing a solenoid operated valve SV.

5. Timer contacts 7 close and cause the roll table to start by energizing a main scarfing control relay SR1. When this relay is energized contacts J4, between wires L20 and 10, close, thereby energizing the roll table forward relay F.

Simultaneously switch F3 between conductors L—20 and 14 of relay F closes, thereby energizing a motor accelerating relay 1A by way of line L—21. This closes a switch 44 between wires 19 and 20, thereby short circuiting resistor R—50 and applying full line voltage from wires L—20 and L—21 to the motor CM.

Contacts J—7 between wires 12 and 13 is for the purpose of preventing the motor CM from reversing the direction of travel of work W after the scarfing operation has started.

Switch D3 is closed when detector D is energized, and provides a path for the timer contact current, when the trailing end of the work W leaves the field of detector A. Thus, when such trailing end leaves the field of detector D, switch D3 opens, causing the system to shut down the desurfacing machine, provided this has not already been done by the opening of contacts 9, as pointed out below.

Inasmuch as the timer TR is initially started by the operation of relay CR of the third detector unit C, and it is essential to keep the timer TR energized after the work passes out of view from such unit C, contacts 35 of relay SR1, between wires 30 and 22, close and shunt switches CS and SD.

After the last timed interval, which in this case is timed interval No. 5, timer contacts 2 open, thus stopping the timer motor TM. As scarfing progresses, the trailing end of the work W passes out of view of detector unit A, thus deenergizing relay AR, and causing the timer to start again by closing switch 33 between wires 23 and 24. After a fixed time interval, and set so as to retract the units U prior to the end of the bar W going through the machine, timer contacts 9, between wires 28 and 29, open, thereby causing retraction of the blowpipe units U.

After the bar W passes out of view from the last detector unit D, relay DR is deenergized, thereby turning off the preheat gases, cutting oxygen and slag-treating water. The timer TR, and likewise the roll table T, can be stopped at this point, but the control shows this to be adjustable as set on timer contacts 8. When contacts 8 open, the main scarfing relay SR1 is deenergized by the opening of such contacts between wires 25 and 26. This in turn stops the roll table motor and resets the sequence timer for beginning the next cycle.

Switch 36 of relay SR1, between wires L20 and 16, shunts the "slowdown" resistors RA and RB and permits starting the roll table motors under normal voltage conditions to obtain scarfing speed.

In case the front end of the work W overtravels the correct preheat position and enters the field of the fourth detector unit D, relay DR is energized, and prevents the timer TR from starting by opening switch SD, between wires 21 and 22. Another switch 37 of relay DR, between wires L20 and 12, is closed and causes the roll table motor CM to reverse at slow speed until the work W backs up out of the field of unit D, and opens the main motor supply circuit, stopping the work W, so that the front end thereof lies between the fields of detector units C and D, causing the scarfing cycle to begin.

Under normal operating conditions, each successive piece of work W is automatically advanced, retarded in stages, stopped, preheated and then processed without attention from an operator. Inasmuch as this is an ideal condition but not always possible in steel mills, due to variable body sizes and temperature changes in the roll table which affects the degree of lubrication of the bearings, the restarting push-button switch RS is included in the control circuit to take care of any contingencies. In the case of false starts, or for other reasons, such as overtravel, the work W can be backed up and the cycle restarted by depressing and releasing the restart push-button. This stops and resets the timer TR and, when the work re-enters the field D' or D'' of detector unit D, the motor CM will reverse and the work W is caused to back-up and stop in the correct preheat position. The cycle will not resume until the restart button is released.

Any suitable detector units may be used without departing from the invention. For example, mechanical switches operated by the body, or photo-electric cells provided with suitable filters or screens may be substituted for the heat-sensitive units.

What is claimed is:

1. In an automatic control system for conveying metal bodies in succession to a thermal treatment station and supporting each body in stationary position while a portion of the body is being heated, which is subject to occasional over-running movement of the body beyond such position, the combination comprising, automatic body back-up means responsive to such over-running movement of a body for moving the body back into proper position with respect to the thermal treatment station, and means controlled by said back-up means for suspending the initation of the heating means until the body returns to such proper position.

2. In an automatic control system for advancing each of a series of bodies into stationary position for thermal treatment and then past a body surface conditioner as the latter acts upon the surface of the body, the combination comprising, heater means for heating a portion of each body in such position, means responsive to successive positions of a body approaching said heater means for reducing the speed of movement thereof and finally stopping the body in operative relation to said heater means, means for conditioning the surface of the body, after a certain time, as such body is moved past the surface conditioner, a timer for initiating such operations, and means including a restarting switch and said body position responsive means for suspending the operation of said timer and moving the body back to the proper stationary position at will.

3. In an automatic control system for conveying heavy bodies of metal in succession to a scarfing station provided with scarfing means, which system is subject to occasional over-running movement of a body, the combination comprising automatic body back-up means responsive to such over-running movement of a body for moving the body back with respect to the scarfing station, and means controlled by said back-up means for suspending the initiation of the scarfing means during such back-up movement of the body.

4. In a scarfing apparatus having a scarfing station provided with scarfing means, mechanism for conveying metal bodies to said station, and activating means for rendering said scarfing means operative to scarf a body conveyed to said station, said mechanism occasionally causing overtravel of a body beyond said station, the combination therewith of the improvement which comprises body back-up means automatically responsive to such overtravel of a body, for actuating said mechanism to move such overtraveled body back to said station; and means controlled by said back-up means for suspending the operation of said activating means while said mechanism moves such body back to said station.

HOMER W. JONES.
EDWARD MEINCKE.

REFERENCES CITED

The following references are of record in the file of this patent:

UNITED STATES PATENTS

| Number | Name | Date |
| --- | --- | --- |
| 1,380,430 | Smith | June 7, 1921 |
| 1,951,426 | Littler | Mar. 20, 1934 |
| 2,016,414 | Cramer | Oct. 8, 1935 |
| 2,072,948 | Geffs | Mar. 9, 1937 |
| 2,089,015 | Bucknam et al. | Aug. 3, 1937 |
| 2,089,029 | Jones | Aug. 3, 1937 |
| 2,177,276 | Bucknam | Oct. 24, 1939 |
| 2,290,626 | Bosomworth | July 21, 1942 |
| 2,309,096 | Bucknam et al. | Jan. 26, 1943 |
| 2,323,977 | Chelborg et al. | July 13, 1943 |
| 2,383,313 | Hoffman et al. | Aug. 21, 1945 |
| 2,410,594 | Andrews et al. | Nov. 5, 1946 |
| 2,424,270 | Ehemann Jr. et al. | July 22, 1947 |
| 2,448,657 | Bucknam | Sept. 7, 1948 |